Nov. 18, 1941. H. P. ELLIOTT 2,262,798
ADDRESSING MACHINE
Filed May 11, 1937 8 Sheets-Sheet 1
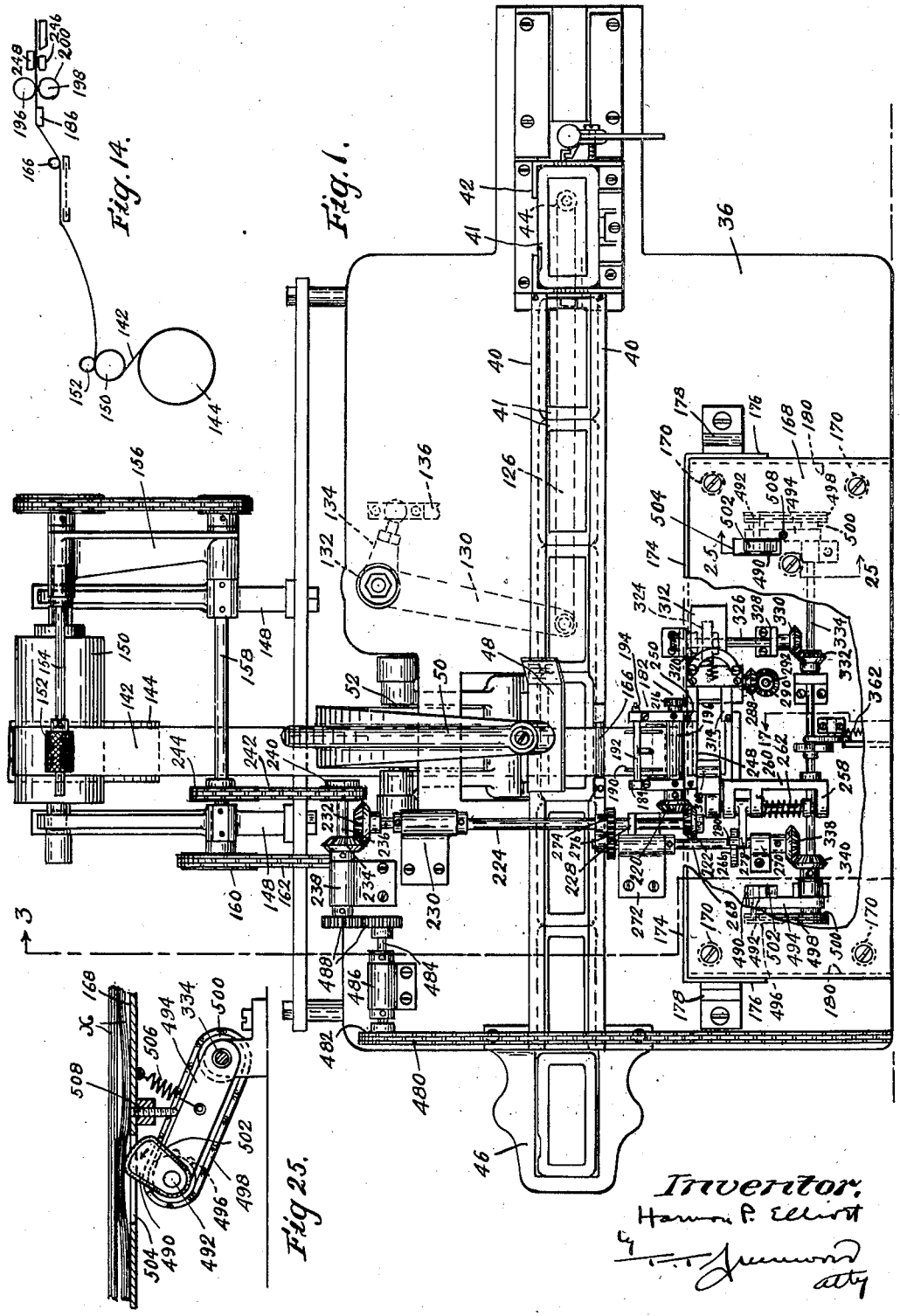
Inventor,
Harmon P. Elliott

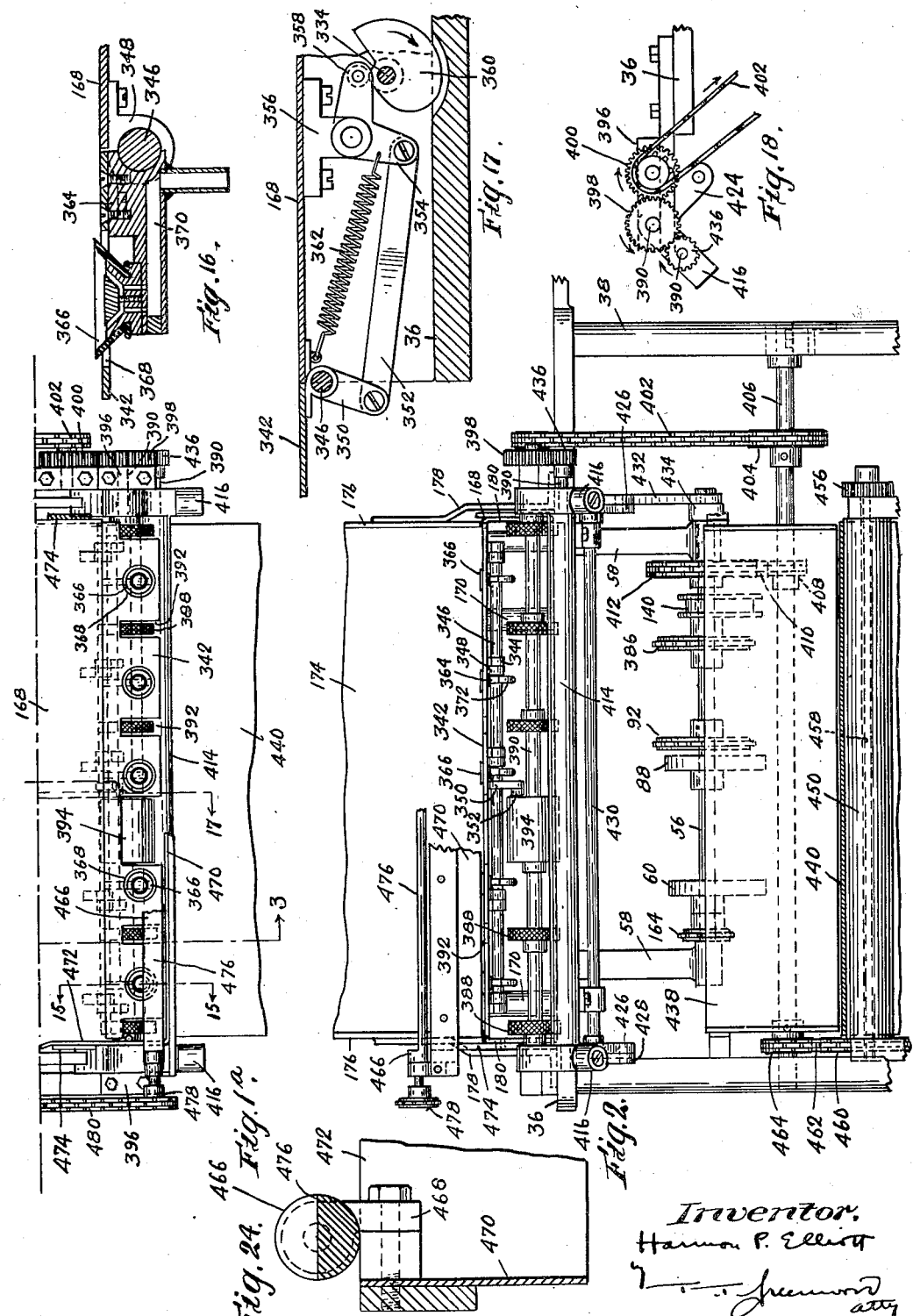

Nov. 18, 1941.  H. P. ELLIOTT  2,262,798
ADDRESSING MACHINE
Filed May 11, 1937  8 Sheets-Sheet 3

Inventor,
Harmon P. Elliott
by [signature] atty

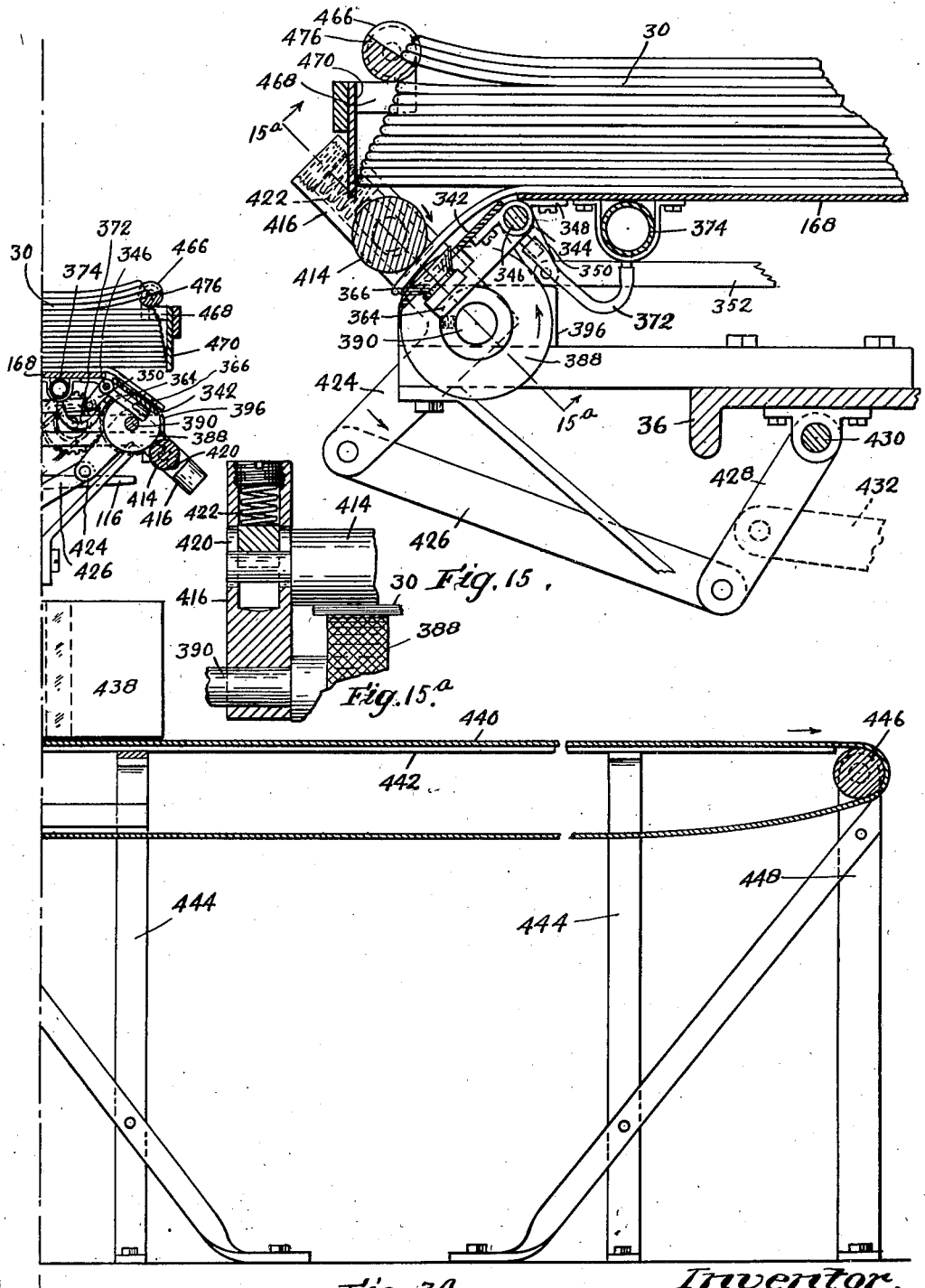

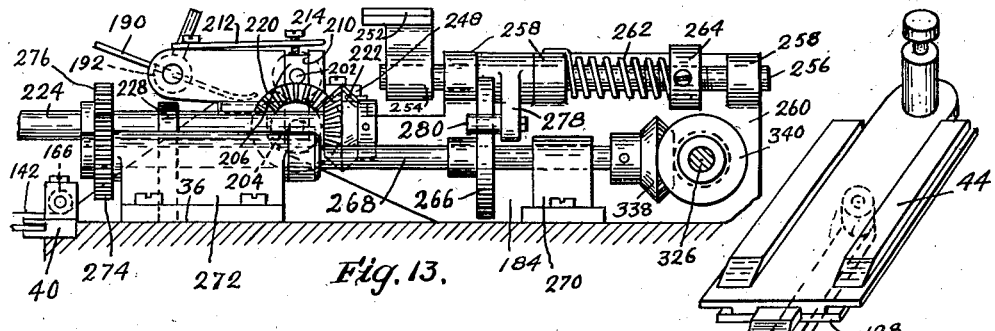
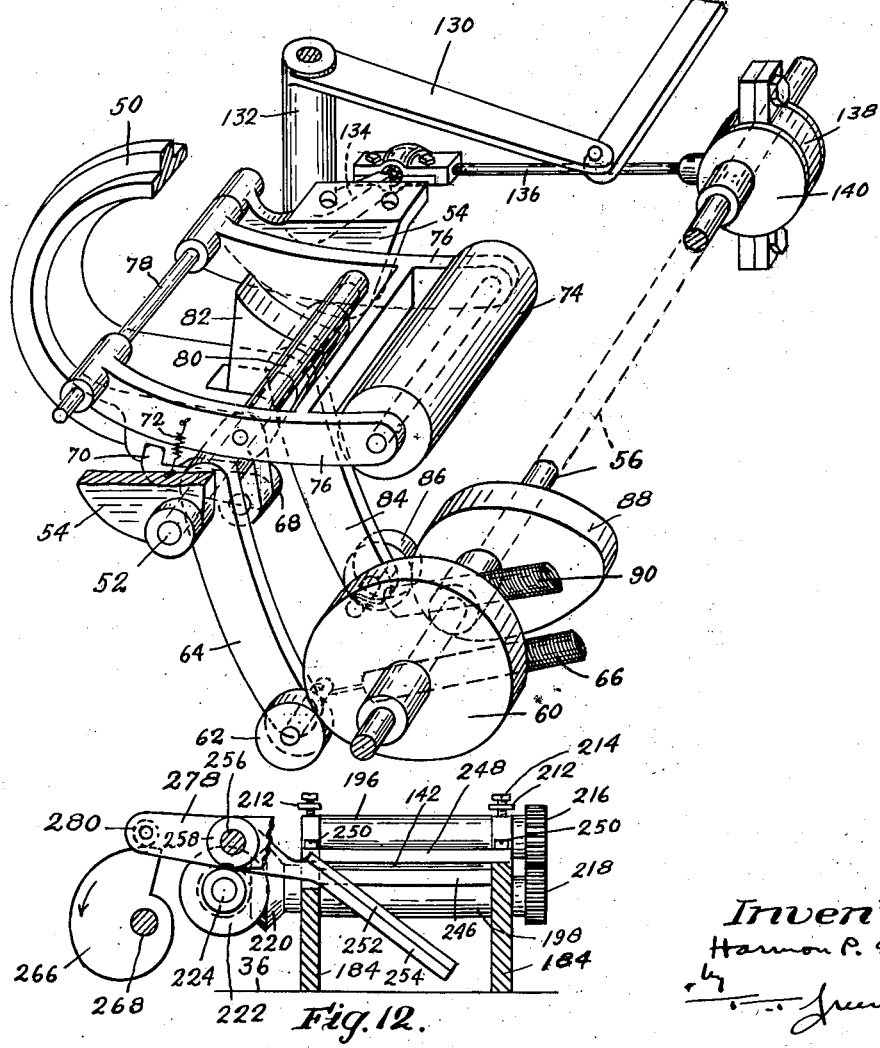

Nov. 18, 1941.  H. P. ELLIOTT  2,262,798
ADDRESSING MACHINE
Filed May 11, 1937   8 Sheets-Sheet 6
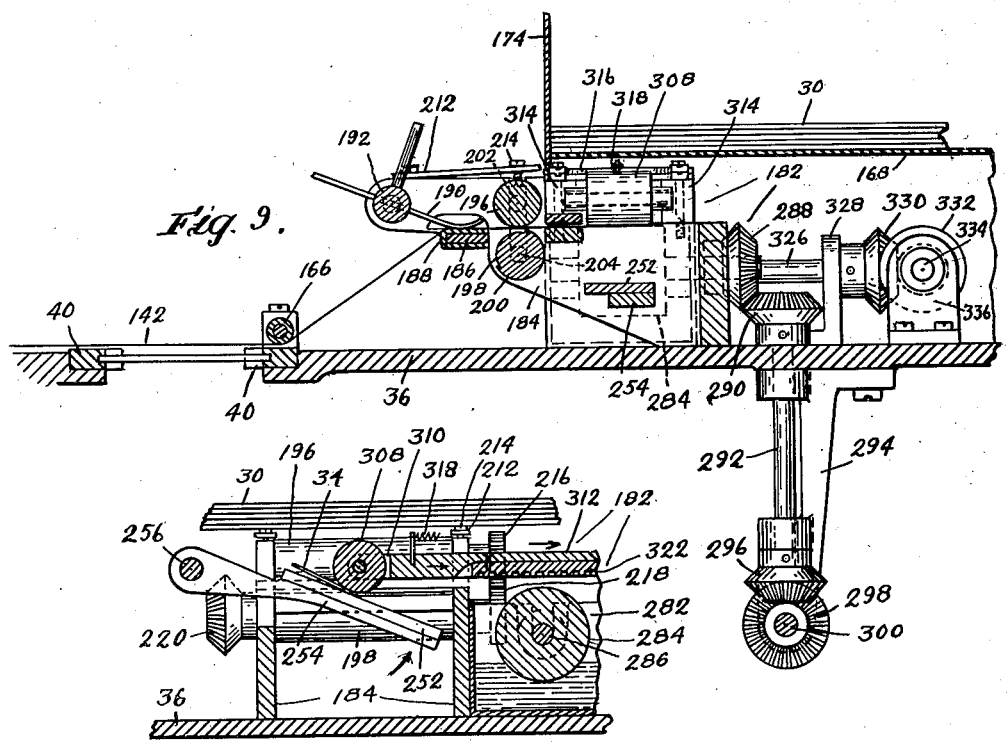
Fig. 9.
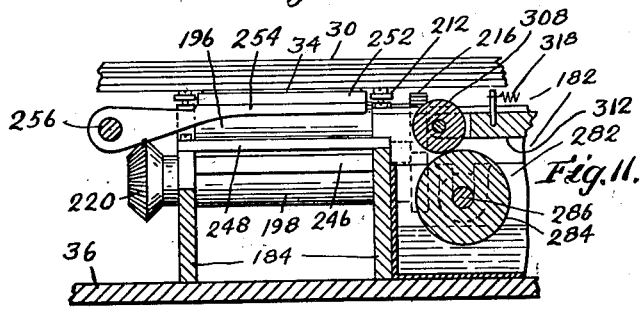
Fig. 10.
Fig. 11.
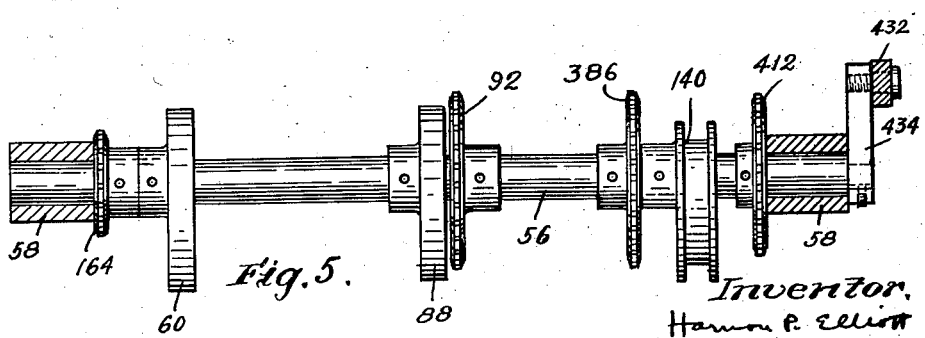
Fig. 5.
Inventor.
Harmon P. Elliott Nov. 18, 1941.   H. P. ELLIOTT   2,262,798
ADDRESSING MACHINE
Filed May 11, 1937   8 Sheets-Sheet 7
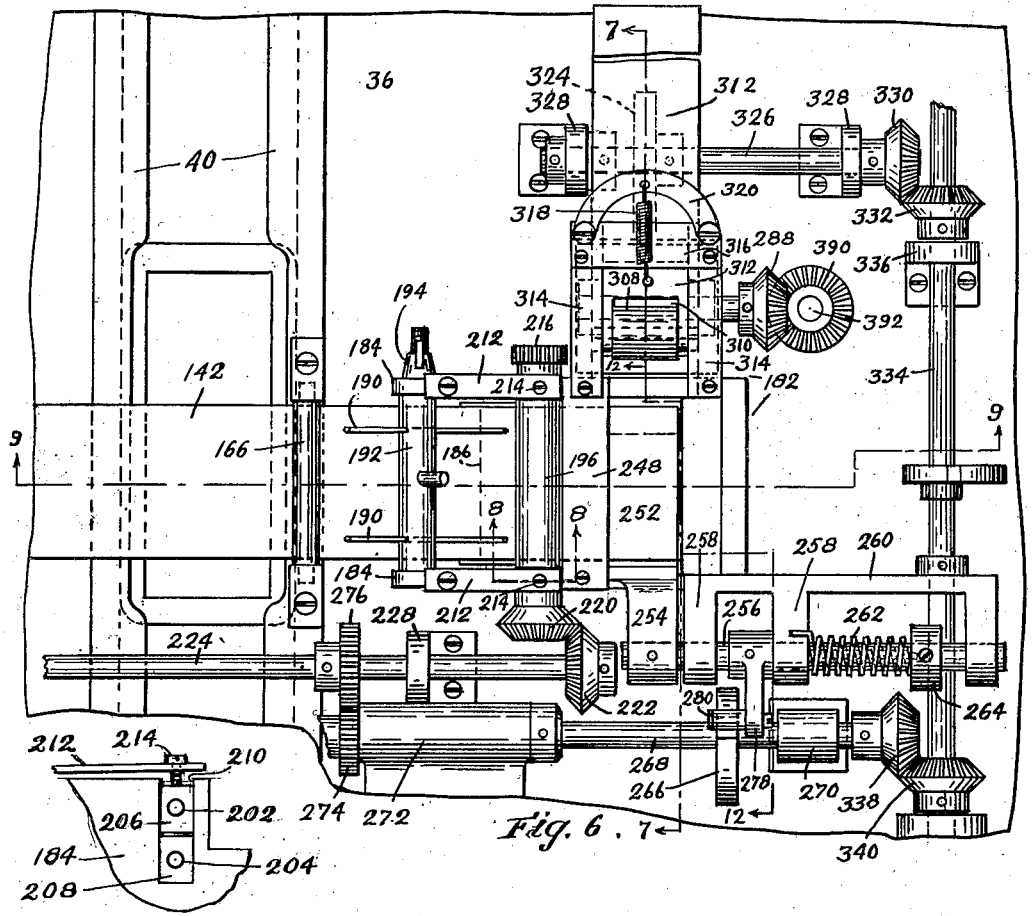
Fig. 6.
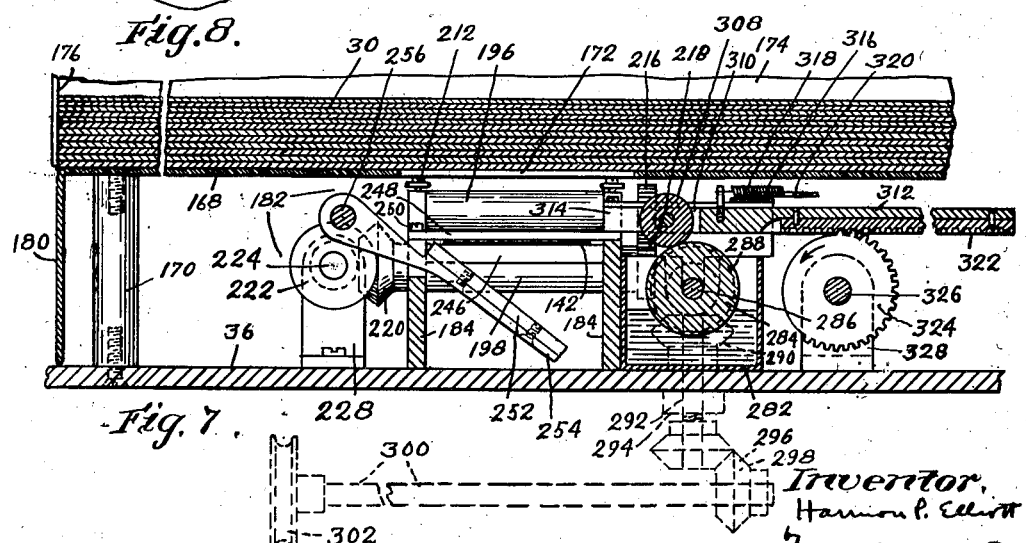
Fig. 8.
Fig. 7.
Inventor,
Harmon P. Elliott

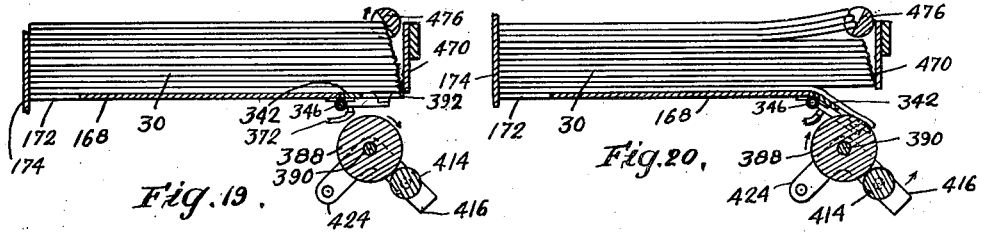
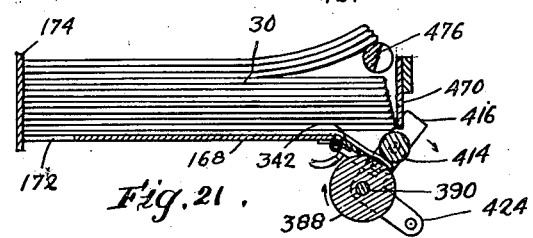
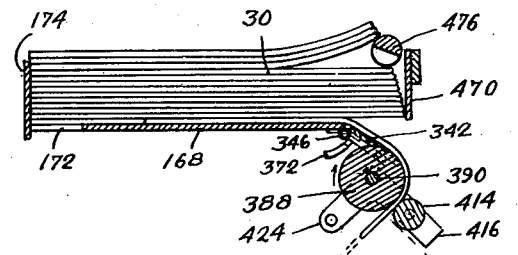
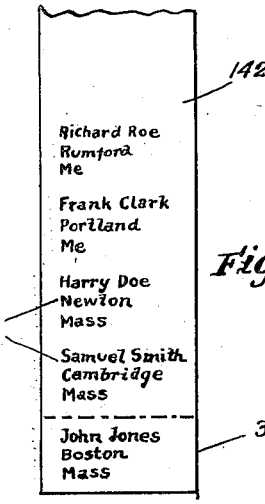
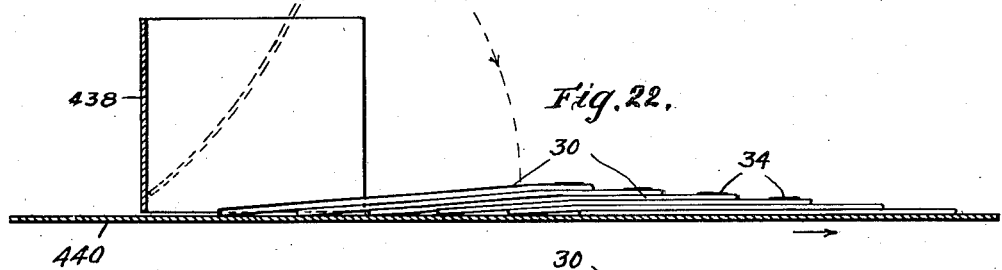
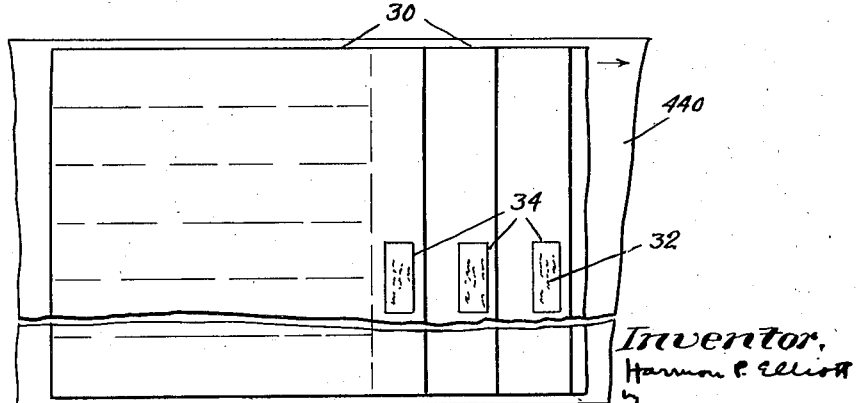

Patented Nov. 18, 1941

2,262,798

UNITED STATES PATENT OFFICE 2,262,798

ADDRESSING MACHINE

Harmon P. Elliott, Watertown, Mass.

Application May 11, 1937, Serial No. 141,981

8 Claims. (Cl. 216—30)

This invention relates to addressing machines and addressing methods and has particular reference to automatically applying addresses to a succession of newspapers, magazines, advertising folders, and the like.

Heretofore in applying addresses to a succession of newspapers or the like articles, it has been proposed to advance the articles in successive order from a stack of such articles to a position where the addresses are applied. A machine so arranged is complicated, more expensive than is economically justified except by large publishers, and complicated mechanism is involved to insure the positive feeding of the articles, which are not always uniform in thickness.

It is an object of the present invention to address the successive articles while they are in a stack and subsequently to remove the successive addressed articles. A machine operating in this manner eliminates the necessity for accurate feeding mechanism for the successive articles so that the machine can be greatly simplified and also is adapted to work upon articles of different thicknesses without the necessity for especial adjustment. The cost thus can be reduced to a figure which justifies the purchase of the machine by all publishers of address-receivable matter.

Another object of the invention is the provision of an addressing machine for applying addresses to the endmost one of a collection, as a stack or pile, of magazines, newspapers, or the like, so supported that the end addressed article can be removed after being addressed to permit the addressing of the successive end articles of the pile or stack.

A further object of the invention is the provision of an addressing machine arranged to apply addresses to the successive end articles of a collection or pile of articles, and means automatically operative to remove the addressed end articles from the collection.

A yet further object of the invention is the provision of an addressing machine constructed and arranged to apply addresses directly to the successive end articles of a collection or pile of such articles.

Another object of the invention is the provision of an addressing machine arranged to apply addresses to labels and to apply the addressed labels to the successive end articles of a collection or pile of such articles.

A further object is the provision of an addressing machine arranged to apply addresses to the successive endmost articles of a stack of such articles and to automatically remove the successive addressed articles from the stack and arrange them in an orderly fashion on a conveyor belt with the addresses exposed to view.

A yet further object of the invention is the provision of an addressing machine arranged to apply different addresses to a label strip, to sever labels each containing an address from the strip, to render the label adhesive, and to apply the conditioned label to the article to cause it to adhere thereto.

The machine embodying a preferred form of the present invention utilizes a knife to sever the successive labels from the strip; and it is an object of the present invention to cause the knife to apply the successive addressed labels to successive end articles of the stack of articles to be addressed.

A further object is generally to improve upon addressing methods and the construction and operation of addressing machines.

Fig. 1 is a plan view of part of an addressing machine embodying the present invention.

Fig. 1a is a continuation of the front end of the machine of Fig. 1.

Fig. 2 is a front elevation of the machines of Figs. 1 and 1a.

Fig. 3 is a sectional elevation taken along line 3—3 of Figs. 1 and 1a.

Fig. 3a is a continuation of the view of Fig. 3.

Fig. 4 is a perspective detail of parts of the printing mechanism and the mechanism for advancing successive printing devices into printing position.

Fig. 5 is a longitudinal view of the main operating shaft for the printing mechanism shown in Figs. 3 and 4.

Fig. 6 is an enlarged plan detail of the mechanism shown in Fig. 1 for applying the addressed labels to the successive lowermost articles to be addressed.

Fig. 7 is a section taken along line 7—7 of Fig. 6.

Fig. 8 is a sectional detail taken along line 8—8 of Fig. 6.

Fig. 9 is a section taken lengthwise of the address label strip along the line 9—9 of Fig. 6.

Fig. 10 is a sectional detail illustrating the label severing knife and the moistening mechanism of Fig. 6, taken along line 7—7 of Fig. 6, with the knife in a partially elevated position and the label partially severed.

Fig. 11 is a view similar to Fig. 10 but with the knife in a fully raised position and pressing the label against the lowermost article to be addressed.

Fig. 12 is a section taken along line 12—12 of Fig. 6 and illustrating the cam for operating the knife.

Fig. 13 is a section taken along line 3—3 of Fig. 1 and illustrating particularly the mechanism for operating the knife and the strip feed rolls.

Fig. 14 is a diagrammatic view taken generally along the median line of the address label strip and illustrating in side elevation the path of the strip.

Fig. 15 is a section taken along line 15—15 of Fig. 1a and illustrating particularly the mechanism for withdrawing the successive lowermost addressed articles from the stack.

Fig. 15a is a section taken along line 15a—15a of Fig. 15.

Fig. 16 is an enlarged cross-section of one of the suction cups of the article removing mechanism.

Fig. 17 is a section taken along line 17—17 of Figs. 1 and 1a, and illustrating the mechanism for reciprocating the table leaf.

Fig. 18 is a sectional detail of the right hand end of Fig. 1a, and illustrating the mechanism for rotating the feed rolls for reciprocating the swinging feed roll.

Figs. 19, 20 and 21 are sectional details of the feeding mechanism taken generally along line 3—3 of Fig. 1a, and illustrating successive positions of the parts effecting the withdrawal of the successive lowermost articles of the stack.

Fig. 22 is a view similar to Figs. 19, 20 and 21, but illustrating the manner of the delivery of the successive lowermost addressed articles onto the conveyor belt.

Fig. 23 is a plan view of the portion of the conveyor belt showing the disposition of the addressed articles thereon.

Fig. 24 is a sectional detail taken along line 15—15 of Fig. 1a, and illustrating particularly the disposition of the stack raising cam.

Fig. 25 is a sectional detail taken on line 3—3 of Fig. 1, but looking toward the left, and illustrating particularly the mechanism for straightening a puckered sheet.

Fig. 26 is a perspective view of an addressed newspaper that is one of the products of the present invention.

Fig. 27 is a plan view of the end portion of the address-bearing label strip, illustrating the blank portion and the addressed portions thereof and indicating the line of severance of the end addressed portion from the body of the strip.

Figures 3, 26:
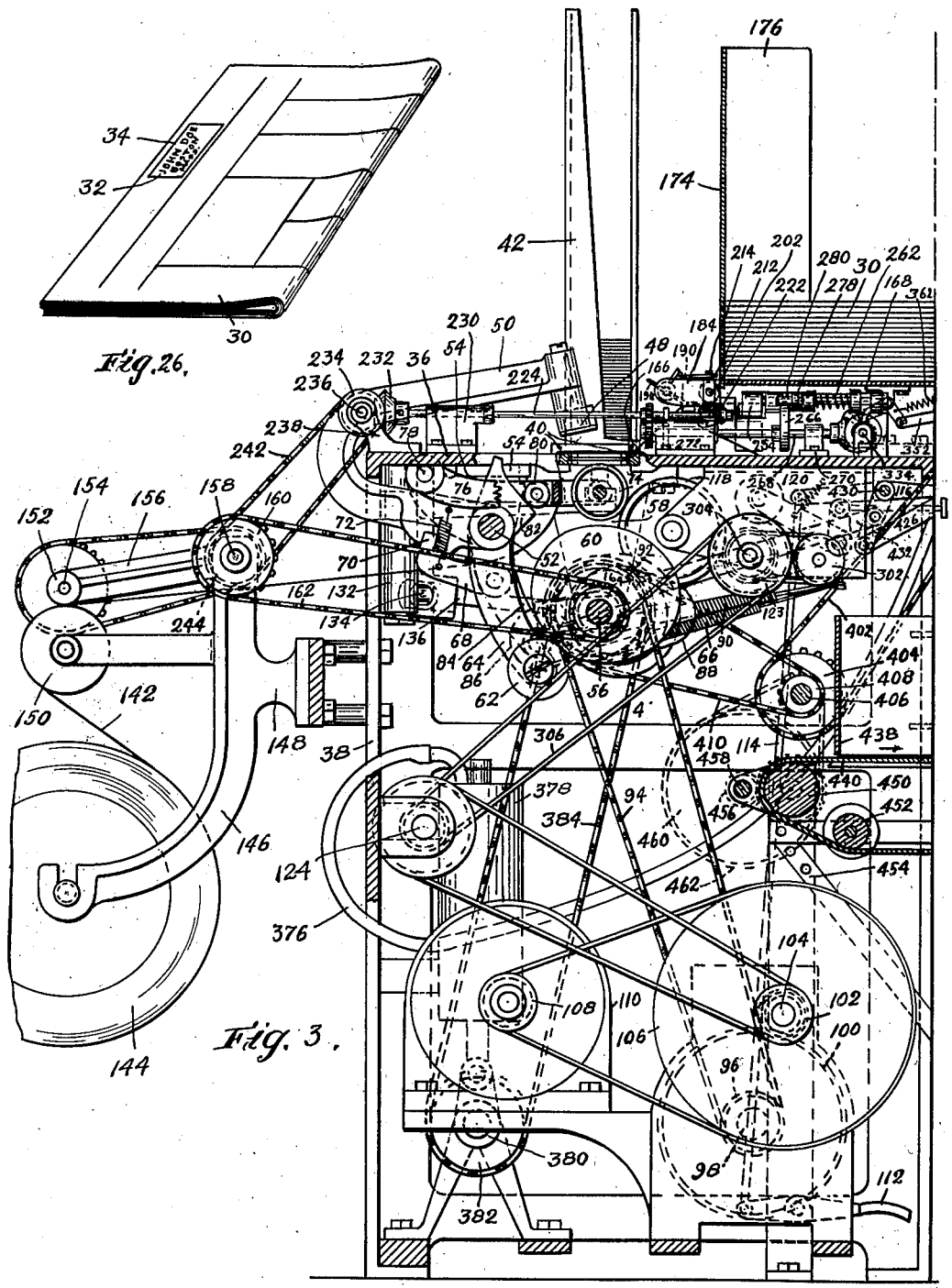

A folded addressed newspaper that is one of the products of the present invention is illustrated in Fig. 26. The paper 30, folded once transversely of its length, has the address 32 applied to the upper or marginal portion of the outermost sheet thereof. The address is printed on a label 34 which is affixed to the newspaper by the machine illustrated in Figs. 1 through 24. The newspaper 30 is herein typically illustrative of the articles capable of being addressed by the present invention, which articles include magazines, advertising folders, and the like.

The machine illustrated in Figs. 1 through 25, and with particular reference to Figs. 1, 3, 4 and 5, includes a flat horizontal bed or table 36 supported upon a suitable frame or standard 38, and having a longitudinally extended groove in which a guideway formed by the parallel spaced rails 40 is located, in which guideway address bearing printing devices, herein specifically illustrated as stencils 41, are advanced in succession from an upright stencil holder 42 located at the left-hand end of the track by a reciprocating pusher 44. The printing devices or stencils pass from the track and are deposited in a stencil receiver 46 located at the other end of the table.

The machine of the present invention is adapted to print upwardly upon work superimposed above the successive printing devices. To this end a platen 48 is located above the guideway or track and is adapted to reciprocate toward and away therefrom to hold the work in contact with the successive printing devices during the printing operation. The platen is secured to the forwardly projecting end of a reciprocating arm 50 which extends rearwardly over the table and is curved downwardly around the rear edge of the table and projects therebeneath and is journalled on a shaft 52 disposed beneath the table and oscillably supported at its ends in brackets 54 fixed to the underside of the table. The platen arm is reciprocated by means including a rotatable operating shaft 56, see especially Figs. 3 and 5, journalled in bearings 58 secured to the underside of the table.

The shaft 56 has a cam 60 fixed thereto which is in rotatable engagement with a cam roller 62 carried by the lower end of an arm 64 journalled on the shaft 52, the cam roller being held in constant engagement with the cam 60 by means of a tension spring 66, one end of which is connected to the arm 64 and the other arm to a fixed part of the machine frame. The arm 64 carries a pivoted latch 68 having a tooth 70 releasably held seated in a notch of the platen arm 50 by a spring 72 so that the arms 64 and 50 are constrained ordinarily to reciprocate as a unit.

In the present machine no provision is illustrated for selecting certain printing devices for printing and for passing unwanted printing devices through the printing position without effecting a printing operation and hence the arms 64 and 50 are kept constantly latched together. When, however, selector mechanism is provided for effecting a printing operation only upon wanted stencils and for disabling the printing mechanism to allow unwanted stencils to pass through the printing position without being printed from, mechanism which can be common in the art, is provided for disengaging the latch 68 from its locking connection with the platen 50. With the present mechanism, however, the latch 68 is not intended to be disengaged from the platen arm.

Cooperating with the platen 48 is a resilient ink carrying impression or printing roll 74. Said roll is located beneath the stencil guideway and is journalled between the forward ends of arms 76 that are pivoted at their rear ends by a shaft 78 to the aforesaid brackets 54 so that the printing roll can be raised and lowered into and out of pressure applying relation with the successive desired printing devices 41 in the guideway.

The mechanism for vertically reciprocating the printing roll includes a cam roller 80 loosely journalled between the arms 76 and cooperating with an oscillable cam sector 82 fixed to the aforesaid shaft 52. Said shaft 52 has fixed thereto a depending arm 84 that carries a cam roller 86 that is in constant rolling engagement with a cam 88 of the operating shaft 56 by means of a tension spring 90. The printing roll, cam 88, and the platen cam 60 are so shaped and relatively disposed as to apply printing pressure to the superimposed work sheet and printing device.

The operating shaft 56 is rotated continuously by means of a sprocket 92 fixed thereto which is engaged by a driving chain 94 in mesh with a sprocket 96 fixed to the rotation-controlled shaft 98 of a power mechanism. The shaft 98 is connected through speed reducing gearing 100 and 102 with a continuously-rotated shaft 104 having a large pulley 106 thereon belted to a small pulley 108 of a driving motor 110. The power mechanism as thus described is more or less common in the art and need not be further described in detail except to state that it includes clutch mechanism operated by a foot pedal 112 that is effective to stop the rotation of the shaft 98 and consequently the operating shaft in such predetermined position of the mechanism that the printing roll and platen are out of engagement with a printing device interposed therebetween, the shaft 104, however, maintaining its rotation continuously so long as the motor 110 is energized.

The lever 112 is connected through linkage mechanism 114 with an operating handle 116 conveniently disposed at the upper part of the machine, see Fig. 3, so that the machine can be stopped at any desired time.

The periphery of the printing roll 74 receives ink from an ink distributing roll or drum 118 forming a part of ink mechanism 120 now common in the art and needing no detailed description. The rolls of the ink mechanism are driven by means of a pulley 122 which is belted to a pulley on a jack shaft 124, which, in turn, is belted to the continuously rotating shaft 104 of the power mechanism.

The stencil pusher 44 is reciprocated by means including a link 126, see Figs. 1 and 4, which is connected to a reciprocating plate 128 to which the pusher is disengageably connected. The forward end of the link is pivotally connected to a forwardly extending arm 130 of a vertically pivoted hub 132 disposed under the table and having an arm 134 that has a ball and socket connection with a connecting rod 136, the forward end of the connecting rod being connected to an eccentric strap 138 on an eccentric 140 fixed to the operating shaft 56. Thus the pusher 44 is caused to make one complete stroke per revolution of the operating shaft.

The machine illustrated in Figs. 1 through 25 is arranged to print a series of addresses along the length of a label strip 142, the addresses being disposed crosswise of the strip, see especially Figs. 1, 3, 14 and 27. The strip 142 is contained in a roll 144 rotatably supported in arms 146 of a bracket 148 secured to the rear part of the machine. The strip passes upwardly from the roll and over an idler roll 150, see Figs. 1 and 3. A knurled or rough surfaced feed roll 152 is in contact with the strip on the idler roll 150 and serves to drive the strip off the roll 144.

The roll 152 is supported on the end of a driven shaft 154 and is journalled in the end of an approximately horizontally disposed arm 156, the other end of which is freely journalled on a shaft 158 that is journalled in the bracket 148. The weight of the arm 156 serves to maintain the roller 152 in driving engagement with the label strip.

The shaft 158 has a positive driving connection with the main operating shaft 56 through a sprocket 160 which is fixed to the shaft 158 and a chain 162 that engages said sprocket, and a second sprocket 164, see especially Fig. 5, that is fixed to the main operating shaft 56. The proportioning of the sprockets is such that the label strip 142 is fed off the strip roll 144 continuously at but very slightly greater speed than the average required rate. If the amount of strip fed by the roll 152 becomes excessive in course of time the roll 152 may be lifted from the strip manually and held from driving engagement with the strip for a few operations of the addressing mechanism or until the excess accumulation of strip between the roll and addressing mechanism has been taken up.

The strip passes loosely from the roll 152 under the table 36 and thence upwardly over the rearmost one of the rails 40 and thence over the guideway formed by the rails and under the platen 48 and under an idler roll 166, see Figs. 1, 3, 6 and 9, journalled in suitable brackets supported by the front-most rail 40 and thence to feeding and severing mechanism located forwardly of the printing device guideway, and illustrated in Figs. 1 and 3, and in larger scale in Figs. 6 through 13. The label strip 142 is advanced by said mechanism in a step by step or intermittent manner through the printing position and in printing relation with the stencils in the guideway and under the platen 48 and at each successive operation of the printing mechanism has recorded on the under face thereof the address borne by the underlying stencil, the stencil being shifted for each shifting of the strip so that the addresses of the stencils are applied crosswise of the strip and in column form thereon.

The strip feeding and severing mechanism is disposed under the vertical stack of articles as newspapers, magazines, and the like, intended to receive the addresses. The stack of articles 30 to be addressed are supported upon a flat plate or table 168, see especially Figs. 1 and 3, which plate is supported in elevated position above the table or bed 36 by suitable studs 170, see also Fig. 7, the table having an aperture 172 therethrough which exposes the undermost face of the rear part of the lowermost article of the strip severing and applying mechanism so that the addressed label can be applied thereto.

The stack of articles is also supported at the back thereof by an upstanding plate 174 having forwardly projecting sides 176 which cooperate with the plate 168 to form a holder or hopper for the articles. The back plate 174 is suitably supported in position by brackets 178 that are secured to the side extensions 176 and to the table or bed 36, see especially Fig. 1. The bottom plate 168 has depending side extensions 180, see Fig. 7, which terminate close to the table 36 to enclose the strip feeding and severing mechanism located under the plate 168.

Said strip feeding and severing mechanism included generally by the numeral 182, see especially Figs. 6, 7, 9, 10 and 11, includes a frame having a pair of side walls 184 between which is extended a horizontal bar 186, see especially Fig. 9, which underlies the label strip 142 and has a shoe 188 thereon which receives and supports the strip 142. The strip is held yieldingly in pressure engagement with said shoe by springy wire fingers 190 which press the strip against the shoe and are carried by a hub 192 journalled in the bracket arms 184 and clamped in a suitably angularly adjusted position therein by suitable means as the wing nut 194, see Fig. 6, screw-threaded on the hub and acting to clamp one of the bracket arms between the hub and the wing nut. With this arrangement the amount of flexure of the spring fingers 190 and consequently the pressure exerted thereby on the label strip can be adjusted. By this arrangement backward movement of the label strip is prevented at the time the feed rolls now to be described are free from driving engagement with the strip.

The label strip passes horizontally from the shelf 186 into the engagement of a pair of upper and lower feed rolls 196 and 198, respectively. The lower roll 198 has a raised peripheral portion 200 that is of a circumferential length, less than the complete circumference, equal to the amount of feed desired of the label strip per address and hence the circumferential length of such raised portion determines the width of the label. When the portion of the lower feed roll that is of reduced diameter is under the upper roll the label strip is not in driving engagement with said rolls and hence is stationary.

The shafts 202 and 204 of the rolls, see Fig. 8, are journalled in bearing boxes 206 and 208 vertically movably located in vertical slots 210 of the bracket arms 184 so that the upper roll 196 can yield vertically to maintain driving engagement with the label strip. Spring members 212 having pressure adjusting screws 214 that bear upon the upper bearing box 206 serve to maintain suitable pressure engagement between the rolls.

The rolls at the similar ends thereof are provided with meshing gears 216 and 218, see especially Fig. 10, so that the rolls are positively driven at the same peripheral speed. The rolls are constantly rotated and positively driven by means of a miter gear 220 which is fixed to the shaft of the lower roll and meshes with a second miter gear 222 fixed to a drive shaft 224 which is supported horizontally above the table 36 in bearing brackets 228 and 230 and passes transversely across the printing device guideway and has a miter gear 232 fixed to the rear end thereof. Said gear meshes with a similar miter gear 234 fixed to a jack shaft 236, see especially Figs. 1 and 3, supported in a bearing bracket 238. Said jack shaft has a sprocket 240 on the end thereof which is engaged by a chain 242 that meshes with a sprocket 158 that is driven by the main operating shaft 56. The diameters of the various sprockets are such that the feed rolls 196 and 198 make one complete revolution for each complete revolution of the operating shaft 56.

The label strip is advanced in an intermittent manner from said rolls 196, 198 across a supporting ledge 246 extended across the bracket arms 184 and under a stationary knife or blade 248 secured to said arms 184 by screws 250. Cooperating with the stationary knife 248 is a movable knife comprising a knife blade 252 fixed to the upper face of a lever 254 that is movable vertically across the line of movement of the label strip and into flat contact with the lowermost one of the stack of articles 30 to be addressed.

The knife lever 254 is fixed to a shaft 256 that is pivotally mounted in ears 258, see Fig. 6, of an extension 260 of one of the side arms 184 of the bracket 182. A helical spring 262 encircles said shaft and has one end fixed to a collar 264 anchored to said shaft and the other end connected with an ear 258 and wound in such direction and so stressed as to tend to rotate said shaft in a counterclockwise direction, Fig. 10, and thereby to urge said movable knife blade for movement in an upward direction and against the lowermost article of the stack.

Retraction of the knife blade is effected by means of a spirally shaped cam 266, Figs. 6 and 12, fixed to a shaft 268 journalled in bearing brackets 270 and 272 secured to and upstanding from the bed 36, said shaft having a gear 274 fixed thereon and meshing with a gear 276 of the same diameter fixed to the roll driving shaft 224 and rotating in timed relation therewith. The knife blade shaft 256 has an arm 278 fixed thereto that is provided at its upper end with a laterally extended pin 280 that overlies and bears against the face of the spiral cam 266. The spiral cam has a sharp drop-off portion so that when the high point of the cam passes out from under the pin 280 the pin is unsupported and the spiral spring 264 then becomes effective to rapidly snap the movable knife blade upwardly.

The movable knife blade 252 is disposed at an angle with respect to the label strip and in its upward movement cooperates with the stationary knife blade 248 to shear a label 34 from the end of the label strip in the manner illustrated in Fig. 10, the shearing starting from one side edge of the strip and travelling progressively to the other edge thereof. The severed label rests on the top of the knife blade which is made broad enough to support it stably and is carried with the knife blade and pressed or slapped against the under face of the lowermost article 30 to receive the address and adheres to such article, the upper surface of the label having been made adherent to such article before the application of the label thereto.

The label strip can be a gummed strip, that is to say, it can have a coating of a suitable adhesive on the face of the strip adapted to contact with the article to be addressed. In this case the gummed surface of the label is adapted to be moistened prior to the engagement of the label with the article so that the label will adhere to the article. The label strip also can be a plain or ungummed strip, in which event the label will have an adhesive applied to its article engaging face prior to its application to the article. The same mechanism can be employed either for moistening the gummed label or for applying an adhesive to the ungummed label. In the particular embodiment of the invention herein shown the label strip is a gummed strip and the gummed surface of the label has water applied thereto so as to moisten the gum and render it capable of adhering to the article to which the label is pressed against.

The mechanism for applying water or moisture to the gummed upper surface of the label includes a reservoir 282 disposed at one side of the bracket 182 in line with the movable knife 252 and adapted to contain a supply of water, in the present instance, or an adhesive if an ungummed or plain label strip is employed. A roll 284 is located within the reservoir with its lower surface dipping into the water and the shaft 286 of said roll is suitably journalled in the side walls of the reservoir. The roll is adapted to be rotated continuously during the operation of the machine and for this purpose the shaft 286 thereof is provided with a miter gear 288, see especially Figs. 3, 6, 7 and 9, which is in mesh with a similar miter gear 290 fixed to the upper end of a vertical shaft 292 which extends through the bed 36 and is journalled in a bracket 294. Said shaft 292 at the lower end thereof has a miter gear 296 fixed thereto which meshes with a corresponding miter gear 298 fixed to a horizontal shaft 300. Said shaft passes through and is journalled in the side plates of the inking mechanism bracket 120 and at the other end thereof has a pulley 302 fixed thereto which is belted to the shaft 304 of the inking mechanism, which shaft is continuously rotated by means of a belt 306 from the jack shaft 124.

A water, or adhesive, applying roll 308, cooperates with the roll 284 and in its idle position is in rolling engagement therewith and in its operating position is in engagement with the endmost label section of the label strip. The roll 308 is journalled between furcations 310 formed in the front end of a reciprocating supporting slide plate 132. Said plate is slidably located in opposed grooves of parallel tracks 314 which are secured to the frame 182 and extend laterally therefrom toward the right, Fig. 6, and are connected at their remote ends by a cross plate 316. A tensile spring 318 is connected between said plate and a bracket 320 secured to said cross plate 316 and tends constantly to urge said roll carrying plate 312 for movement toward the right into an unoperated position where the roll 308 is in rolling engagement with the distributing roll 284. Fig. 11 illustrates the retracted position of the plate and roll.

The plate 312 and hence the roll 308 are advanced across the end of the label strip by means of a rack 322, see Fig. 7, fixed to the underside of the plate 312 and meshing with a gear 324 having interrupted teeth and fixed to a shaft 326, see Fig. 6, journalled in brackets 328 upstanding from the bed 36. Said shaft 326 has a miter gear 330 thereon which meshes with a similar miter gear 332 fixed to a shaft 334, journalled in brackets 336 fixed to and upstanding from the bed 36. Said shaft 324 is driven from the knife blade controlling shaft 268 by a pair of meshing miter gears 338 and 340 which are fixed to the respective shafts.

Said moisture applying roll 308 is supported at such elevation that it can reciprocate with its lower surface in line with the upper surface of the end part of the label strip, that is to say, the part that projects forwardly of the stationary knife blade 246.

The arrangement of the parts is such that the roller 308 is at the forward or left hand end of its stroke and the teeth of the gear 326 have just passed beyond engagement with the rack 322 at the same time that the cam 266 has released the movable knife blade. Hence the knife blade springs upwardly and presses the free end of the label strip against the roll 308. The strength of the knife blade spring 262 is stronger than the strength of the roll retracting spring 318. Thus the knife blade assists in urging the roll 308 backwardly. With this arrangement the roll 308 is caused to travel in pressure engagement with the end of the label strip and transversely thereacross in the manner illustrated in Fig. 10, as the label is being sheared off the strip. Thus the movable knife blade serves as the anvil to support the label at the time the gummed surface thereof is receiving the moisture carried by the roll 308 and hence the gummed surface is thoroughly moistened. The same action takes place if the roll 308 carries an adhesive. As soon as the roll 308 passes beyond the free end of the knife blade the knife blade snaps upwardly carrying the moistened label with it and slaps the label onto the under surface of the lowermost article 30 of the stack of articles. The knife blade cam 266 with its continued rotation then moves the knife blade downwardly and the roller slide plate 312 is ultimately re-engaged by the teeth of the gear 324 to advance it forwardly for another operation.

The knife 252 is intended to slap up against the under face of the lowermost article in the stack in the operation of applying the address bearing label thereto, rather than to exert a large amount of pressure on the article. The upward movement of the knife is limited by its operating cam. Hence the knife is effective in causing the addressed labels to adhere to the lowermost article in the stack irrespective of the number or weight of the articles since the knife does not exert any great pressure upon the lowermost article, it being sufficient merely to bring the adhesive surface of the label into good contact with the article to cause the wet label to cling to the article. The label will adhere strongly thereto when the adhesive sets.

The successive lowermost and addressed articles in the stack can be removed from the stack manually by grasping the forward folded edge portion of the article and pulling it out of the stack. For some purposes the machine as herein described will be provided for the manual withdrawal of the addressed articles. The present machine, however, is provided with means for automatically removing the successive lowermost addressed articles and depositing them upon a conveyor belt in partially overlying relation so that the addresses of the articles are visible. The addressed articles can be removed from the conveyor belt and assembled into bundles for mailing or shipment.

For the purpose of automatically withdrawing the successive lowermost articles from the stack the front edge of the article supporting table or bed 168 is provided with a leaf 342 which is fixed by brackets 344 to a hinge rod 346 that is journalled in hinge members 348 fixed to the under side and forward edge of the plate 168. Said leaf is reciprocated in a forward direction by mechanism including an arm 350, see Figs. 15 and 17, fixed to and depending below the hinge rod 346 and pivotally connected by a link 352 to the downwardly depending arm of a bell crank 354 which is pivoted on a bracket 356, see also Fig. 1, secured to the underside of the plate 168. The rearwardly extended arm of said bell crank overlies the shaft 334 and has a cam roller 358 thereon which rides upon a spiral cam 360 fixed to said shaft 334. The cam controls the reciprocation of the hinged leaf 342. A tension spring 362 connected with the bell crank lever serves to tend to urge the hinge leaf for upward movement while the cam moves the leaf downwardly against the action of the spring. The cam 360 makes one complete cycle of rotational movement for each cycle of rotation of the main operating shaft 56.

The table leaf 342 is provided with a plurality of suction cups which serve to grip the lowermost article 30 of the stack and pull it downwardly away from the superposed articles. To this end a plurality of cup supporting bars 364, see Figs. 15 and 16, are secured to the underside of the leaf 342 close to the hinge rod 346 and at spaced intervals along the length of the leaf and are provided with upstanding rubber walled suction cups 366 which extend through apertures 368 of the leaf and the flexible lips of which cups project somewhat above the top face of the leaf. The hinge bars are provided with air ducts 370 therein and each duct separately is in communication through a flexible tube 372 with a common suction pipe 374 that is disposed beneath and is secured to the table plate 168.

Said pipe is in communication through a tube 376, see Fig. 3, with the cylinder 378 of a single acting air pump, the crank shaft 380 of which is driven through a sprocket 382 fixed to said shaft and a chain 384 meshing with said sprocket from a sprocket 386, see Fig. 5, fixed to the operating shaft 56. The timing of said air pump is such that suction is exerted by said suction cups at the time the leaf 342 is moved downwardly and the suction effect is then subsequently eliminated.

With the arrangement shown, when the table leaf is elevated to horizontal position parallel with the supporting plate 168 and the suction cups are in engagement with the underface of the lowermost one of the articles 30 in the stack, a partial vacuum is set up in said cups by the air pump by the time the leaf is moved downwardly. Hence the lowermost article of the stack is held against said leaf and is flexed downwardly away from the superposed articles by the downward movement of the leaf, thereby bending the front edge portion of the lowermost article downwardly, as illustrated in Fig. 15, and away from the rest of the stack. In the lower position of the hinge leaf the lowermost article moved downwardly therewith is brought against the knurled or roughened surfaces of a plurality of drive rolls 388 fixed in axially spaced relation on a shaft 390 and being engageable with the articles on the leaf through slots 392 formed in the leaf. Said shaft 390 is also provided with an additional driving roll 394 which is located in line with the address and is smooth faced so as not to exert sufficient traction on the sheet to effect the displacement or detachment of the freshly applied label.

Said shaft 390 is rotatably supported at its ends in bearing brackets 396 fixed to the table or bed 36 and at the left hand end thereof, see Figs. 1a and 18, has a gear 398 thereon which meshes with a driving gear 400 journalled in the right hand bracket 396. Said gear 400 is driven by a chain 402, see also Fig. 3, passed over a sprocket 404 fixed to a cross shaft 406 journalled in the frame of the machine and driven by a sprocket 408 and chain 410 from a sprocket 412 fixed to the main operating shaft 56.

At the time the forward edge of the article is upon the surfaces of the driving rolls the article is caused to be pressed into firm driving engagement therewith by a long relatively small diameter roll 414 which is parallel to the axes of the rolls 388. Said roll 414 is journalled at its ends in the forwardly extended arms 416 of bell crank levers 418 pivoted upon the shaft 390. The roll 414 is disposed in longitudinally directed slots 420 of said arms 416 and is urged by pressure of springs 422 carried by said arms toward the rolls 388 and engage said rolls when there is no article therebetween. Said roll 414 is capable of moving outwardly away from the roll 388 by the entering pressure of the article so as to maintain good driving engagement with the article regardless of variations of thickness thereof, within reasonable limits.

Said bell cranks 418 are provided with downwardly extended arms 424 by which the bell cranks are guided and reciprocated to swing the roll 414 from the normal article-free positions shown in Figs. 3a, 19 and 20, to the article-feeding positions shown in Figs. 15, 21 and 22. To this end said bell cranks 418 are pivotally connected to the forward ends of links 426 which extend rearwardly and at their rear ends are pivotally connected to the lower end of depending links 428 that are pivotally connected to brackets 430 secured to the under face of the bed 36.

The right hand link 428 is pivotally connected to the forward end of a connecting rod or link 432, illustrated in Figs. 2 and 3, and in dotted line, Fig. 15. Said link at its rear end is pivotally connected to a crank arm 434, see Fig. 5, fixed to the main operating shaft 56. Thus as said shaft makes a complete revolution the bell cranks and the roll 414 make a complete reciprocatory movement.

The edge of the table leaf in its lower position with the downwardly bent forward edge of the article thereon is terminated within or close to the peripheries of the driving rolls 388. The roll 414 as it is moved upwardly rolls in engagement with the rolls 388 and thus rolls onto and over the front edge portion of the lowermost article. Hence the article is gripped between the rotating rolls and is withdrawn from the stack of articles. The roll 414 and the rolls 388 are driven positively at equal peripheral speeds, the roll 414 at the right hand end thereof having a gear 436 fixed thereto which is in mesh with the driving gear 398 of the shaft for the rolls 388.

The roll 414 is reciprocated in a regular manner and hence moves downwardly and at the same time advances the article and in the lowermost position causing the discharge of the article against a back plate 438 which guides the rear end of the article, that was the forward end in the stack, to be deposited upon the upper pass of a conveyor belt 440 and to fall upon the previously deposited article. The arrangement is preferably such that there is sufficient exposure of the label-bearing edge-portion of the articles, as illustrated in Figs. 22 and 23, to expose the addressed labels of the successive articles to facilitate their collection in suitable groups for mailing or shipment.

The upper pass of the belt is supported in horizontal position and is movable over a plate or table 442, see Fig. 3, which is supported from the floor by suitable brackets 444. The belt at the forward end thereof is supported by an idler roll 446 journalled in brackets 448. At the rear or machine end the belt passes over a driving roll 450 and an idler roll 452, both being supported by brackets 454, see Fig. 3. The driving roll 450 is driven through a gear drive 456 from a shaft 458 having a sprocket 460 thereon driven by a chain 462 from a sprocket 464 on the shaft 404.

For some types of articles, as, for instance, heavy magazines or newspapers, it is sometimes desirable to remove the weight of the front part of the major portion of the stack of articles from the front edge portion of the lowermost article. For this purpose mechanism is provided to raise the front edge portions of the articles in the major portion of the stack. Said mechanism includes a shaft 466 which is journalled at its ends in brackets 468 fixed to a front plate 470 that is located immediately in front of the forward edges of the articles in the lowermost portion of the stack and has rearwardly projecting sides 472 that are secured by brackets 474, see Figs. 1a and 2, to the downwardly projecting sides of the bottom plate 168 of the stack.

The shaft 466 has half of its diameter removed at that portion thereof confronting the stack, or is half round, to provide a cam portion 476 for engaging and raising the articles of the stack that are disposed in front of and above it. Said shaft is located somewhat rearwardly of the front plate 470 and in position to have its cam part 476 engage under the forward edge of an article and raise it and the superimposed articles as the shaft rotates, as illustrated in Fig. 15, and in Figs. 19, 20 and 21.

Said shaft is rotated in timed relation with the rotation of the main operating shaft by means including a sprocket 478, see Figs. 1, 1a and 2. Said sprocket meshes with a chain 480 that is in driving engagement with a sprocket 482 fixed to a jack shaft 484 journalled in a bracket 486 located at the rear end portion of the table 36. Said shaft 484 is driven through intermeshing gears 488 with the shaft 236.

The operation of the shaft 466 and its cams 476 is illustrated in Figs. 19 through 21. In an unoperated position thereof, corresponding generally with a horizontal position of the table leaf 372, the flat face of the cam is more or less parallel with the front edge of the stack of articles. As the cam rotates in a clockwise direction, as viewed in these figures, the lowermost portion of the flat face thereof engages under the edge of an article of the stack and raises it and the superimposed articles in the manner illustrated in Fig. 20, this operation taking place at about the time the table leaf 372 is moving downwardly. Continued rotation of the shaft brings the cylindrical portion under the superimposed articles, as illustrated in Fig. 21, and holds them elevated above the lower articles, during which time the feed rolls are operative to withdraw the lowermost article from the stack. At the end of a complete operation the cam releases the stack to permit the stack to drop downwardly by the thickness of the removed article and the above described operation is repeated in successive operations.

In withdrawing articles of certain types, as, for instance, newspapers, it sometimes happens that the lowermost leaf of the article that is immediately above and is in contact with the lowermost article becomes advanced or is moved partially outward or puckered due to the frictional drag thereupon by the lowermost article in the process of removing it from the stack. Fig. 25 illustrates such a condition where the lowermost leaf X of an article has been advanced from its normal position and puckered.

Mechanism is herein provided to retract the leaf so that the suction cups can firmly engage the forward edge portion of the article and effect its deflection and removal in the intended manner. Said mechanism includes a pair of cams 490, see Figs. 1 and 25, located under the stack table 168 and fixed to separate shafts 492 journalled in arms 494 pivoted on the aforesaid shaft 334. Said shafts 492 have sprockets 496 fixed thereto which are driven by chains 498 from sprockets 500 fixed to the shaft 334, thereby to rotate the cams. The faces of the cams are preferably roughened or provided with increased frictional effect as by rubber bands 502 which encircle the cams. The cams operate through slots 504 of the table 168 and are maintained yieldingly in elevated and article engaging position by tension springs 506 which are connected with the arms 494 and tend to hold said arms yieldingly against adjustable stop members 508. The high parts of the cams rotate in pressure engagement with the lowermost article of the stack and are so shaped and timed in rotation as to engage and move back to its original position any displaced or puckered sheet X of the next to the bottom article at the time it assumes the lowermost position in the stack and prior to its removal therefrom. The cams are free from engagement with the lowermost article at the time it is withdrawn from the stack.

The term stack as used in the claims is intended to imply an orderly close arrangement of the articles, whether the stack of articles be generally horizontal or vertical.

For some purposes it may be desirable to apply the addresses to the label strip 142 by a separate addressing machine. In this case the addressing part of the machine will be rendered inactive by disengaging the latch 68 from the platen arm 50 and disabling the impression roller operating arm 84 by unhooking the spring 90, or removing the platen 48 and impression roll 74 from the machine, or eliminating the printing and stencil feed mechanism entirely.

I claim:

1. In an addressing machine, a holder for a stack of articles, said holder having provision for the removal of the successive lowermost articles from the stack, means for advancing an address-bearing strip, and mechanism for severing successive end portions of said strip bearing an address and for adhesively affixing successive severed addressed end portions onto the successive lowermost articles of the stack before they are removed from the stack.

2. In an addressing machine, a holder for a stack of articles, said holder having provision for the removal of the successive lowermost articles from the stack, means for advancing an address-bearing label strip under said holder, and mechanism including a knife which severs successive address-bearing labels from the end portion of said strip and carries the labels upwardly onto the successive lowermost articles of the stack.

3. In an addressing machine, a holder for a stack of articles, said holder having provision for the removal of the successive lowermost articles from the stack, means for advancing an address-bearing label strip in proximity with the stack, label applying mechanism including means to render the successive labels adhesive, and means including a knife to sever the successive labels from the strip and to move said labels onto the successive lowermost articles of the stack.

4. In an addressing machine, a holder for a stack of articles, said holder having provision for the removal of the successive endmost articles from the stack, means for advancing an address-bearing label strip into proximity with the end of the stack, means including a knife arranged to sever the successive labels from the strip and to carry said labels upon the successive endmost articles of the stack, and means for rendering said labels adhesive coincidently with their severance from the strip.

5. In an addressing machine, a holder for a stack of articles, said holder having provision for the removal of the successive endmost articles from the stack, means for advancing an address-bearing label strip, means including a knife for severing successive labels from the end of the strip and for depositing the labels upon the successive endmost articles of the stack, and means including a conditioning roller movable over the address-free face of the label at the time it is being severed from the strip for conditioning the label to adhere to the article.

6. In an addressing machine, a holder for a stack of articles, said holder having provision for the removal of the successive endmost articles from the stack, means for advancing an address-bearing label strip into proximity with the end of the stack, means including a knife which severs the successive address-bearing labels from the strip and has a broad face which supports the free label and carries it to and deposits it upon the face of the endmost article of the stack, and means including a conditioning roll that is engageable with the label on said knife for rendering the label adhesive.

7. In an addressing machine, a holder for a stack of articles, said holder having provision for the removal of the successive endmost articles of the stack, means for advancing an address-bearing label strip into proximity with the end of the stack, means including a knife for severing successive address bearing labels from the end of the strip, said knife being movable against the successive endmost articles of the stack and having a broad face for supporting the detached label and for transporting it to the endmost article, and means including a conditioning roller movable over the endmost label at the time it is engaged with said knife and being severed from the strip, for rendering the label adhesive.

8. In an addressing machine, a holder for a stack of articles, said holder having provision for the removal of the successive endmost articles of the stack, means for advancing an address-bearing label strip in proximity with the end of the stack, a knife for shearing the successive address-bearing labels from the end of the strip, said knife having a broad face which supports the severed addressed label and being movable against the endmost article to deposit the label thereagainst, a conditioning roller movable transversely of the end portion of the strip over the knife, and mechanism for operating said roller and knife to press said endmost label against said transversely moving roll at the time the label is being severed from the strip.

HARMON P. ELLIOTT.